Figure 1:
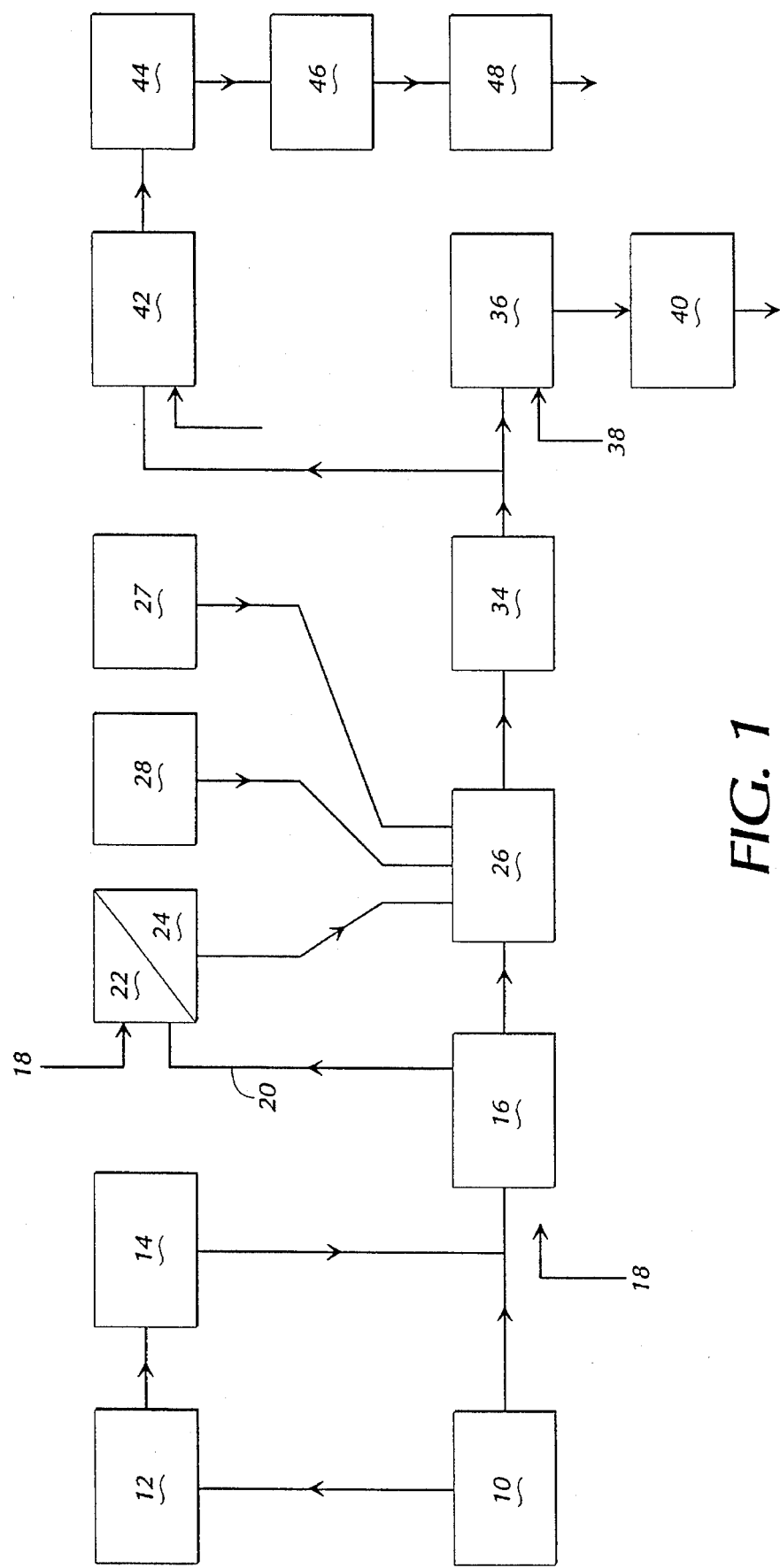

United States Patent [19]

Donalisio

[11] Patent Number: 5,456,739

[45] Date of Patent: Oct. 10, 1995

[54] PROCESS FOR RECLAIMING ALUMINUM FROM WASTE PAPER AND PACKAGING PRODUCTS

[76] Inventor: Guilherme C. Donalisio, Praca Gardenias, No. 44, 13300 Itu, SP, Brazil

[21] Appl. No.: 175,154

[22] Filed: Dec. 23, 1993

[51] Int. Cl.$^6$ .................................................. C01F 7/74
[52] U.S. Cl. ............................................ 75/403; 423/556
[58] Field of Search ................................ 75/403; 423/556

[56] References Cited

U.S. PATENT DOCUMENTS

| | | | |
|---|---|---|---|
| 2,977,255 | 3/1961 | Lowry | 75/403 |
| 4,320,098 | 3/1982 | Huckabay | 423/556 |

Primary Examiner—Peter D. Rosenberg
Attorney, Agent, or Firm—Luedeka, Neely & Graham

[57] ABSTRACT

Aluminum is recovered from organic waste paper and packaging material containing aluminum foil by heating the waste material in a kiln or other such device to decompose the organic constituents in the waste material, preferably by pyrolysis, producing hot gaseous by-products with a carbonaceous ash residue containing aluminum. The ash residue is contacted with an aqueous solution of sulfuric acid under conditions which cause the aluminum to react with the sulfuric acid to produce aluminum sulfate. Preferably, the ash/acid contacting is carried out with a relatively dilute sulfuric acid solution and at an elevated temperature in the range of from about 80° C. to about 100° C. to produce $Al_2(SO_4)_3 \cdot 18H_2O$ as the reaction product.

7 Claims, 2 Drawing Sheets

PROCESS FOR RECLAIMING ALUMINUM FROM WASTE PAPER AND PACKAGING PRODUCTS

The present invention relates to a process for recovering the aluminum foil content from waste paper and packaging products containing aluminum foil. More particularly, the present invention relates to a process for reclaiming the aluminum foil content of spent paper and packaging products as aluminum sulfate.

Aluminum sulfate is widely used in industry, such as for treating waste water and in the production of paper. Aluminum sulfate is typically obtained from the reaction of bauxite with sulfuric acid. This process is disadvantageous as the aluminum sulfate often contains a significant amount of impurities, such as iron and other elements which are present in the bauxite. The presence of such impurities, particularly iron, in aluminum sulfate is especially disadvantageous when the aluminum sulfate is to be used in the production of white paper, since the iron discolors the paper.

Thus, it is common to further treat aluminum sulfate which is to be used in the production of white paper to remove iron and other impurities. This additional purification adds to the cost of providing acceptable grade aluminum sulfate and it will be appreciated that there is a need in the art for a relatively low cost source of essentially iron-free aluminum sulfate.

Significant quantities of aluminum are used in the production of paper and packaging products as barrier film and for other purposes. When these products have been used up, as in their contents having been removed, they are typically discarded as trash and sent to landfills or incinerated. There is currently great pressure to recycle as much paper as possible to lessen the burden on landfill facilities and to reduce the rate of deforestation. Much development is being directed toward processes for recycling paper products, but many processes under development are not suitable for products containing metal foil barrier films which must still generally be disposed of in conventional ways, or, such recycle processes reject the metallic components with other waste as unusable by-products of the recycling process.

Accordingly it is an object of the present invention to provide an improved process for producing aluminum sulfate.

Another object of the present invention to provide an improved process for producing aluminum sulfate having little or no impurities which avoids the need for further purification steps.

It is another object of the present invention is to provide a process of the character described which enables the production of aluminum sulfate from waste materials.

Yet another object of the invention is to provide a process for recovering aluminum from waste paper and packaging products containing aluminum.

Still another object of the present invention is to provide a method of the character described which is relatively simple, economical, cost effective, and energy efficient.

Having regard to the foregoing and other objects, the present invention is directed to a process for producing aluminum sulfate from organic waste paper and packaging material containing aluminum foil. According to its more general aspects, the invention comprises heating the waste material in a kiln or other such device to decompose organic constituents in the waste material, preferably by pyrolysis, producing hot gaseous by-products with a carbonaceous ash residue containing aluminum. The ash residue is contacted with an aqueous solution of sulfuric acid under conditions which cause the aluminum to react with the sulfuric acid to produce aluminum sulfate. Preferably, the ash/acid contacting is carried out with a relatively dilute sulfuric acid solution and at an elevated temperature in the range of from about 80° C. to about 100° C. to produce $Al_2(SO_4)_3 \cdot 18H_2O$ as the reaction product.

The present invention advantageously enables at least partial reclamation of waste materials that may otherwise produce negative environmental consequences, while also providing a low cost material for use in the production of aluminum sulfate as well as useful energy from the decomposition of the waste material. In addition, the present invention enables production of a relatively high purity aluminum sulfate which avoids the need for subsequent purification steps.

Figure 2:
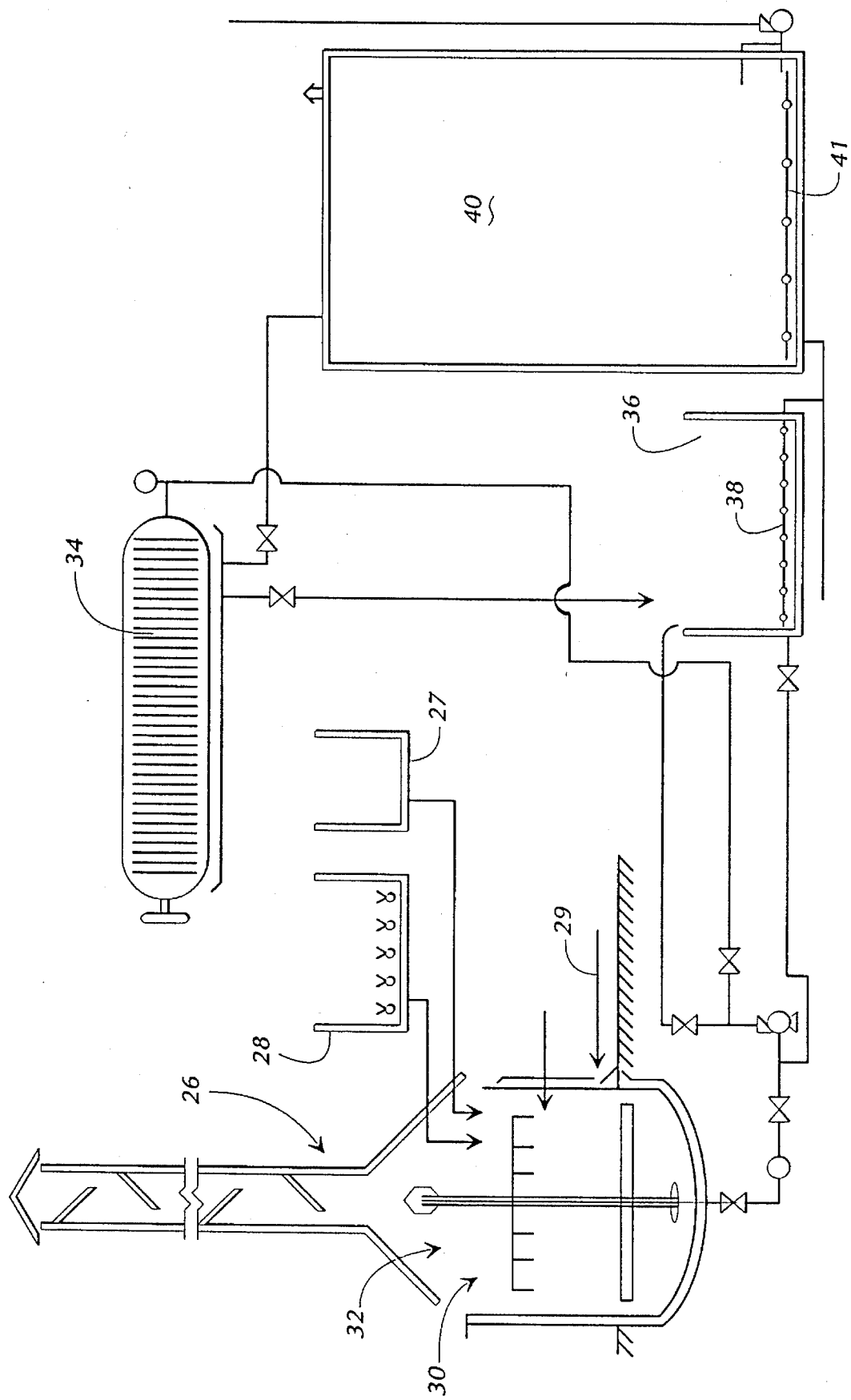

These and other features and advantages of the invention will now be further described in the following specification with reference to the accompanying drawings in which:

FIG. 1 is a flow chart of various steps in a process for producing aluminum sulfate according to one embodiment of the invention; and FIG. 2 is a diagrammatic view showing in more detail steps in the process of FIG. 1 wherein aluminum is reacted with sulfuric acid to produce aluminum sulfate.

With reference now to FIG. 1, steps in a preferred embodiment of a process are shown for recovering aluminum from organic waste material containing aluminum foil. The invention has application to a wide range of waste materials including milk cartons and other aseptic food packaging formed of paperboard and including layers of plastic and a barrier film of aluminum foil for limiting penetration of light, and for other reasons.

In addition, the recycling paper industry makes use of metal foil barrier-containing waste paper and board products for the production of recycled paper. The result from this recycle process is waste residue composed of aluminum, plastic and some fiber which is typically disposed of in a conventional fashion. However, the aluminum in this waste residue may also be reclaimed using the present invention. Thus, it will be appreciated that the present invention is further advantageous to provide a use for the residue resulting from the recycling process, as the aluminum foil content wastes of the recycle packaging and paper industry presently have little if any commercial value and are a source of solid waste having an associated cost of disposal.

In the process, organic waste material 10 containing aluminum foil is preferably first conveyed to a shredder 12 to comminute or shred the material into a less voluminous form having a high surface area with a low void volume which may therefore be more easily handled and treated than the unshredded material. The shredded material then may be conveyed to a washer 14 where it is contacted, as by spraying, with a solvent such as water, to wash and otherwise dislodge and remove impurities such as dirt, solid and liquid food waste and the like from the material.

The washed and shredded raw material is conveyed to a rotary kiln 16 of the continuous or non-continuous type with a suitable arrangement of burners 18, preferably having two stages of temperature, one for drying of the material and the other for high temperature decomposition of the material, preferably by pyrolysis. In this manner, therefore, the raw material is initially subjected to a relatively low temperature (preferably below about 300° C.) in an initial drying stage to dry the washed, shredded material. The dried material may then be subjected to elevated temperatures, preferably from about 350° C. to about 500° C., sufficient to accomplish substantially complete heat decomposition (pyrolysis) of plastic and cellulosic constituents of the waste material without melting or unduly promoting oxidation of the aluminum. The heating of the material at the elevated temperature gasifies and/or pyrolyizes plastic and cellulose fractions, with the production of a carbonaceous ash residue containing an appreciable amount of aluminum. The kiln is preferably operated under a reducing atmosphere to minimize oxidation of the aluminum, which may be accomplished by insuring that little or no oxygen enters the kiln during the process.

Hot gases generated in the kiln 16 may be filtered, as at baghouse 20, and thereafter conducted to a steam boiler 22 or furnace 24 as a source of thermal energy which may be used in the process to facilitate transformation of the aluminum recovered from the kiln into aluminum sulfate, as described below. Accordingly, it will be understood that the gases evolved from the kiln represent a source of thermal energy which may be harnessed to help reduce operating costs associated with the reclamation of aluminum in accordance with the present invention.

With additional reference to FIG. 2, the aluminum-containing residue or char from the kiln is introduced into a batch or continuous reactor 26 as by conveyor 29 and mixed therein with a sulfuric acid solution, as from vessel 27, heated water, as from vessel 28, direct steam, as from source 30 and preferably using thermal energy recovered from the hot gases in steam boiler 22 by various heat exchangers associated with vessels 27 and 28 and steam source 30 in a manner well-known to those of ordinary skill in the art. Mixing of the components in the reactor 26 is preferably accomplished by mechanical agitation, as by stirrer 32. The temperature of the aqueous streams entering the reactor 26 is preferably in the range of from about 80° C. to about 100° C. Reaction of the components in the reactor is believed to produce an aqueous solution of aluminum sulfate by the reaction:

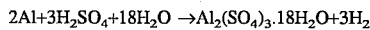

$$2Al + 3H_2SO_4 + 18H_2O \rightarrow Al_2(SO_4)_3 \cdot 18H_2O + 3H_2$$

The aluminum sulfate solution at a temperature in the range of 80° C. to about 100° C. is then filtered as by passing the solution through a press filter 34 or other suitable device. Filtration of the solution typically yields a small quantity of residual carbon which may be used to clarify the solution and discarded. Activated carbon may be added to assist in the filtration.

The filtered solution is then preferably conducted to a tank 36 having a heater 38 or other suitable evaporative apparatus such as a multiple effect evaporation system and/or crystallizer to heat the solution sufficiently to evaporate a portion of the water to obtain the desired dilution strength, which is preferably about 27%, and the solution may thereafter be conducted to storage tank 40 which may contain a heater 41. If it is desired to produce anhydrous aluminum sulfate, $Al_2(SO_3)_4$, the solution may be conducted from the tank 40 to an open evaporator 42 for the additional removal of water and then conducted to a cooling and crystallization tray 44 or other suitable apparatus well-known to those of ordinary skill in the art to convert the hydrate to the anhydrous form. The aluminum sulfate may also be ground, as at 46, and thereafter stored or packaged, as at 48.

As will be appreciated, the present invention may be used to provide relatively low cost aluminum sulfate which is of relatively high purity and essentially iron-free. The invention also enables reclamation of aluminum from waste paper and packaging products in an energy efficient and cost effective manner with positive environmental effects to produce a commercially valuable relatively pure aluminum sulfate product useful in a wide range of industries.

The foregoing description of certain embodiments of the present invention has been provided for purposes of illustration only, and it is understood that numerous substitutions, modifications or alterations may be made without departing from the spirit and scope of the invention as defined in the following claims.

What is claimed is:

1. A process for recovering aluminum from organic waste material containing aluminum comprising the steps of heating the waste material in a rotary kiln under conditions of pyrolysis to decompose organic constituents in the waste material to produce a carbonaceous ash residue containing elemental aluminum and hot gaseous by-products and contacting the ash residue from the kiln with an aqueous solution of sulfuric acid under conditions which yield high purity, essentially iron-free aluminum sulfate as a reaction product in the solution.

2. The process of claim 1, wherein the conditions of the contacting are such that the aluminum sulfate reaction product includes hydrated aluminum sulfate, $Al_2(SO_4)_3 \cdot 18H_2O$, and the process further comprises heating the hydrated aluminum sulfate to produce anhydrous aluminum sulfate, $Al_2(SO_4)_3$.

3. The process of claim 1, further comprising the step of comminuting the organic waste material to provide organic waste material which is more efficiently treated and thereafter washing the comminuted waste material with water to remove solid and/or liquid impurities.

4. The process of claim 1, wherein the step of heating waste material in the kiln comprises initially drying the waste material by exposing the material to a relatively low temperature of less than about 300° C. and thereafter pyrolizing the dried material by exposing the dried material to temperatures of from about 350° C. to about 500° C. so that oxidation of aluminum in the material is minimized.

5. The process of claim 1, wherein the contacting of the ash residue with the sulfuric acid solution is carried out at a temperature in the range of from about 80° C. to about 100° C.

6. The process of claim 1, further comprising the step of recovering thermal energy from the hot gaseous by-products and using the thermal energy to heat the sulfuric acid solution.

7. A process for recovering aluminum from organic waste material containing aluminum comprising the steps of comminuting the waste material, washing the comminuted waste material with water to remove solid and/or liquid impurities, conveying the washed comminuted waste material to a rotary kiln, drying the waste material in the kiln by exposing the material to a relatively low temperature of less than about 300° C., pyrolyzing the dried material in the kiln to produce a carbonaceous ash residue containing elemental aluminum and hot gaseous by-products, contacting the ash residue from the kiln with an aqueous solution of sulfuric acid under conditions which yield a high purity, essentially iron-free aluminum sulfate as a reaction product in the solution.

* * * * *